(12) United States Patent
Tsuji

(10) Patent No.: US 7,447,696 B1
(45) Date of Patent: Nov. 4, 2008

(54) SUBCODE-DATA GENERATING CIRCUIT

(75) Inventor: Masaaki Tsuji, Osaka (JP)

(73) Assignee: RICOH Company, Ltd., Tokyo (JP)

( * ) Notice: Subject to any disclaimer, the term of this patent is extended or adjusted under 35 U.S.C. 154(b) by 0 days.

(21) Appl. No.: 09/394,661

(22) Filed: Sep. 13, 1999

(30) Foreign Application Priority Data

Sep. 17, 1998 (JP) ............................. 10-263661

(51) Int. Cl.
G06F 17/00 (2006.01)
(52) U.S. Cl. ..................... 707/101; 707/100; 707/102; 707/10
(58) Field of Classification Search ............... 386/95, 386/68, 69; 369/47.12; 360/15; 707/1, 100
See application file for complete search history.

(56) References Cited

U.S. PATENT DOCUMENTS 5,311,492 A * 5/1994 Tabuchi et al. ............... 360/15
6,075,920 A * 6/2000 Kawamura et al. ............ 386/95
6,442,334 B1 * 8/2002 Kawamura et al. ............ 386/95
6,470,141 B2 * 10/2002 Kawamura et al. ............ 386/95

FOREIGN PATENT DOCUMENTS

| JP | 2310658  | 12/1990 |
| JP | 06076495 | 3/1994  |
| JP | 07021590 | 1/1995  |
| JP | 10083613 | 3/1998  |
| JP | 10302389 | 11/1998 |

* cited by examiner

Primary Examiner—Sana Al-Hashemi
(74) Attorney, Agent, or Firm—Cooper & Dunham, LLP

(57) ABSTRACT

A subcode-data generating circuit generates subcode data including subcode component data which indicates any one of time information and information other than the time information. This circuit includes a first generating portion for automatically generating the subcode component data in the case where the subcode component data indicates the time information, a second generating portion for automatically generating the subcode component data in the case where the subcode component data indicates the information other than the time information, and a selecting portion which selects one of the outputs of the first and second generating portions.

7 Claims, 13 Drawing Sheets

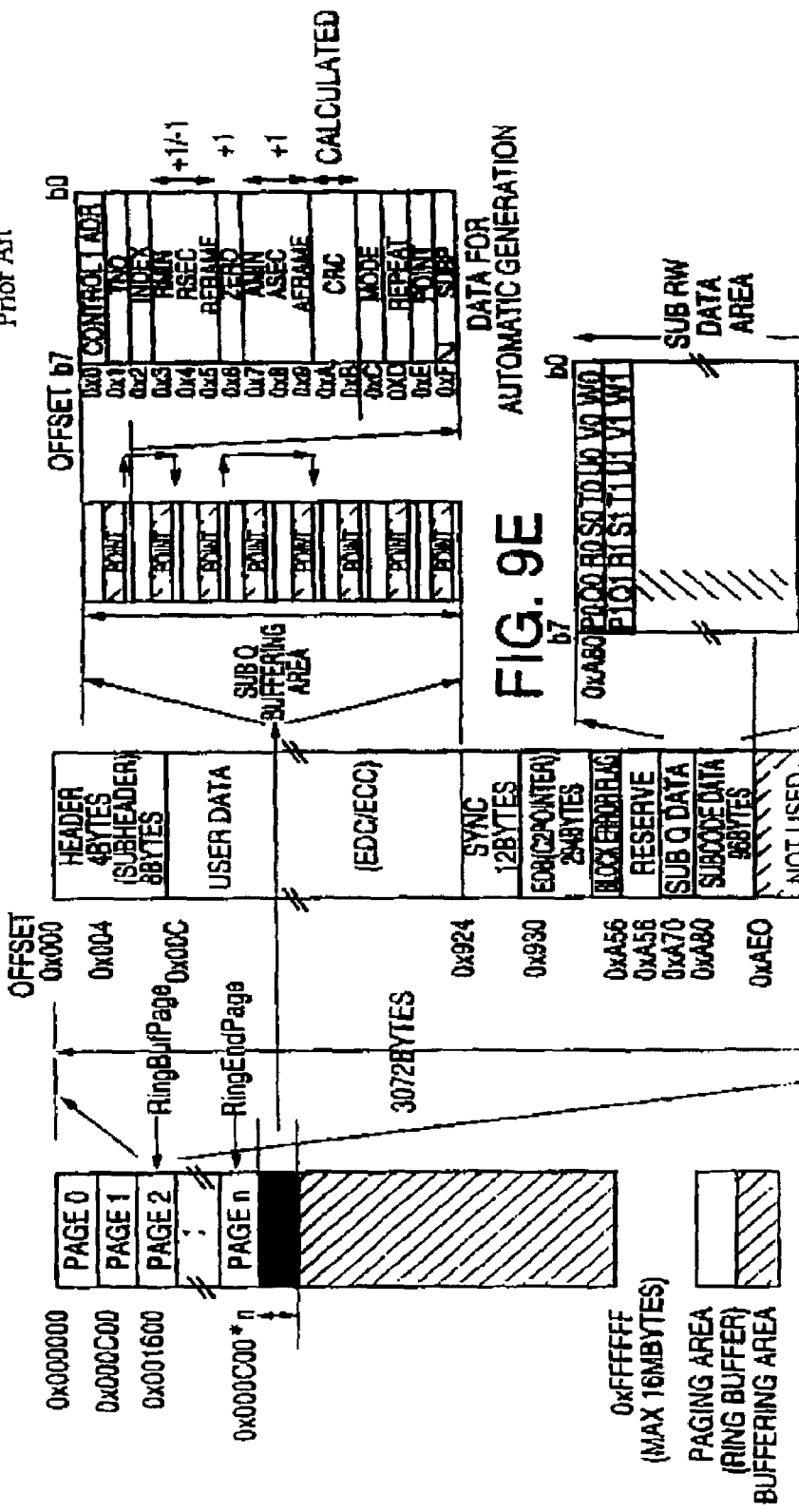

Prior Art

|   |         | REPEAT | POINT |
|---|---------|--------|-------|
| 0 | Adr0,1  | 100    | 1     |
| 1 | Adr2    | 1      | 2     |
| 2 | Adr0,1  | 100    | 3     |
| 3 | Adr2    | 1      | 4     |
| 4 | Adr0,1  | 100    | 5     |

SUBCODE-DATA GENERATING CIRCUIT

BACKGROUND OF THE PRESENT INVENTION

1. Field of the Invention

The present invention relates to a data processing circuit provided in a player or the like which is used for a recording medium such as CD-ROM, CD-R, CD-DA, CD-RW, the data processing circuit processing data read from the recording medium or processing data to be written onto the recording medium.

2. Description of the Related Art

In a recording medium such as a CD-ROM, data is recorded in a predetermined format for each frame. The format has a form in which head data, user data, synchronizing data, other various data and subcode data are stored in the stated order. For the subcode data and user data, a mutual time relationship should be maintained. When the user data and subcode data are managed in a linear buffer area, management table information is prepared specially (see Japanese Laid-Open Patent Application No. 2-310658).

However, when the management table information is provided specially, and a system control unit refers to this table information and performs necessary control, the load of the system control unit increases, and it is difficult to cope with high-speed processing such as processing for an 8-time speeds, a 10-times speed or the like.

Therefore, the applicant of the present application, in consideration of the above-mentioned situation, proposed, previously, in Japanese Laid-Open Patent Application No. 10-302389, a data processing circuit, an object of which is to eliminate necessity of the management table information by maintaining the time relationship of data in a page unit, to reduce the load of the system control unit, and to improve the memory use efficiency, in a case where processing is performed in a page unit, by providing a page region and a buffer region separately.

This data processing circuit will now be described based on FIGS. 1-10C.

FIG. 1 shows a block diagram of the data processing circuit 100 and peripheral circuits thereof. The data processing circuit 100 is connected to a system controller 17, an AT attachment (ATA) 18, and a digital signal processor (DSP) 19. The data processing circuit 100 performs writing/reading of signals on a DRAM 2, which acts as a buffer memory, and transfer of these signals between the DRAM 2, and the system controller 17, AT attachment (ATA) 18 and digital signal processor (DSP) 19. The data processing circuit 100 includes various masters (which are main processing circuits, and specific names and functions of which will be described later) 3-7, a buffer manager 16 and a DRAM controller 1.

The system controller 17 controls the data processing circuit 100, transmits data to and receives data from a system controller interface (system controller IF) 3 which is a master. The AT attachment 18 forms a host bus, and transmits data to and receives data from a host interface (host IF) 4 which is a master. The digital signal processor (DSP) 19 divides data, which is transmitted from an EFM (Eight-to-Fourteen Modulation) processing unit, not shown in the figure, into CD-DA data and the subcode data. The digital signal processor 19 provides the CD-DA data in the form of serial data to a CD-DA interface (CD-DA IF) 6, which is a master, and provides the subcode data in the form of serial data to a subcode interface (subcode IF) 7, which is a master, at the time of decoding. The digital signal processor 19 combines the CD-DA data provided by the CD-DA interface 6 and the subcode data provided by the subcode interface 7, and transmits the combination to the EFM processing unit. However, there is a type of the DSP in which the main data and subcode data are outputted in parallel using a bus through the DSP.

As shown in FIG. 2, the DRAM 2 is used after being divided into a paging area and a buffering area, through processing by the data processing circuit 100. Pages 0 through n (the size of the page being fixed) are allocated to the paging area, and page n+1 and the subsequent pages (the size of the page not being fixed) are allocated to the buffering area. In each page, various data for one sector of a recording medium such as a CD-ROM or a CD-DA can be stored. FIG. 2 will be described in detail later.

The system controller interface 3, which is the master, performs processing such as transferring data, transferred from the system controller 17, to one page of an area which is indicated by the value stored in a system buffer page (SysBufPage) 8, and so forth.

A sector processor 5, which is a master, is a processing block which performs EDC (error correction)/ECC (error detection) on data for a CD-ROM, for example. The sector processor performs processing of the data stored in one page of an area indicated by the value stored in a sector processor buffer page (SPBufPage) 11.

The CD-DA interface (CD-DA IF) 6, which is the master, performs processing such as storing serial data transmitted from the digital signal processor 19 in one page indicated by the value stored in a CD buffer page (CDBufPage) 12. At the time of storing, in a case of CD-ROM data, the sync pattern of one block is detected, and control is performed such that one block corresponds to one page.

The subcode interface (subcode IF) 7, which is the master, performs processing such as storing serial data for the subcode data, inputted from the digital signal processor 19, in one page indicated by the value stored in a subcode buffer page (SubBufPage) 13, and so forth. However, there is a type of the DSP in which the data is not serial data. At the time of storing, the sync pattern of the subcode data is detected for each frame, and control is performed such that one frame corresponds to one page.

The host interface (host IF) 4, which is the master, performs processing such as transferring the data, transferred from a host bus such as the AT attachment 18, an SCSI, or the like, to one page indicated by the value stored in a host buffer page (HstBufPage0) 9a, for each sector, and so forth. The host can access a buffering area, which will be described later. For indicating the page, a host buffer page (HstBufPage1) 9b is prepared.

The buffer manager 16 includes page controllers (page control) 14, connected to the masters 3, 4, 5, 6 and 7, respectively, various page registers (specific names thereof will be described later) 8, 9a, 9b, 11, 12 and 13, address generators (address generate) 15, connected to the masters 3, 4, 5, 6 and 7, and to the page registers corresponding thereto, respectively, and a ring-end-page (RingEndPage) storing unit 10 which stores therein the ring end page ('n' in the example of FIG. 2). The buffer manager performs arbitration of access from the masters 3, 4, 5, 6 and 7, and generation of addresses (current address) for the DRAM controller 1. Specifically, each master makes an access request to the buffer manager 16 by expressing a request. When multiple requests are made by the respective masters simultaneously, the buffer manager 16 performs arbitration through priority control, and returns an acknowledgement signal (ack) to one master. Thereby, the buffer manager 16 performs data access for this master. Each master can inform the buffer manager 16 of a page-register updating request by expressing increase (inc). Each page controller 14, when receiving this updating request, refers to the ring end page stored in the ring-end-page storing unit 10, and performs updating of the value stored in the respective page register.

The DRAM controller 1 is connected with the masters 3, 4, 5, 6 and 7 via data lines, and, also, in response to a request from the buffer manager 16, generates various signals and addresses for controlling the DRAM 2. Then, the DRAM controller 1 transmits data to and receives data from the master which has made the request. The DRAM controller 1 performs 8-bit data transfer between the DRAM controller 1 and the system controller interface 3. The DRAM controller 1 performs 16-bit data transfer between the DRAM controller 1 and each of the other masters.

FIG. 2 illustrates how each master accesses buffer data. Each master manages data to be currently processed in a page unit. As described above, the arrangement of the buffer RAM of the DRAM 2 is such that the area indicated by page 0 through page n (n is the value of the ring end page) is referred to as the paging area, and the area indicated by page n+1 through the last page (the last of the mounted memory) is referred to as the buffering area. Whether it is possible to access only the paging area, whether it is possible to access both the paging area and buffering area, and whether there is a difference between the time of decoding and the time of encoding in the case where it is possible to access both the paging area and buffering area, for each master, are indicated in TABLE 1, shown later. The master, which can access only the paging area, processes page 0, when the processing up to page n is finished. The processing therefor is performed by the page register corresponding to this master. The master, which can access the buffering area, can process the page n+1. FIG. 2 shows the state at the time of decoding. The CD-DA interface 6 and subcode interface 7 write data, read from the recording medium, to page 0, page 1, page 2, . . . , in sequence (FIG. 2 shows the state in which writing to page 2 is currently performed). The sector processor 5 accesses page 0, page 1, page 2, . . . , to which data was already written, and reads the data, performs error correction on the data, and returns the data (FIG. 2 shows the state in which processing of page 1 is currently performed). FIG. 2 shows the state in which the AT attachment 18 accesses page 0 via the host interface 4, and receives the data obtained as a result of the correction being performed.

FIG. 3A shows the arrangement of the buffer RAM in the DRAM 2. FIG. 3B shows a data format in a page in the case of CD-ROM. FIG. 3C shows a data format in a page in the case of CD-DA. The amount of 3072 bytes is allocated to each page, and the user data and the subcode data are stored therein. The amount of data stored in each page is smaller than the size of the page, and, in the figures, 288 bytes are not used. 96 bytes are used for the subcode data, which includes data expressed by symbols such as P, Q, R, S, T, U, V and W. The details thereof will be described later.

The following TABLE 1 clarifies the offset, access area, and so forth of each master.

TABLE 1

| Master | offset | PageRegister | Access area | |
|---|---|---|---|---|
| | | | Pagingarea | Bufferingarea |
| CD-DA IF | 0x000-0xA56 | CDBufPage | ○ | X |
| Sector Pro | 0x000-0xA56 | SPBufPage | ○ | X |
| Sub-code | 0xA70-0xADF | SubBufPage | ○ | XDec, ○Enc |

TABLE 1-continued

| Master | offset | PageRegister | Access area | |
|---|---|---|---|---|
| | | | Pagingarea | Bufferingarea |
| IF Host IF | 0x000-0xFFF | HstBufPage0, 1 | ○ | ○ |
| Sys Con IF | 0x000-0XFFF | SysBufPage | ○ | ○ |

FIG. 4 is a flowchart showing page-register updating control in the page controller 14, in the case where the master is the CD-DA interface 6. After initial setting (in a step S1), it is determined (in a step S2) whether there is a page-register updating signal (inc) from the master. When it is determined that there is the page-register updating signal, it is determined (in a step S3) whether the current value of the CD buffer page (CDBufPage) 12 is smaller than the value of the ring end page (RingEndPage) 10. When the current value of the CD buffer page 12 is smaller than the value of the ring end page 10, the value of the CD buffer page 12 is incremented by 1 (in a step S4). When the current value of the CD buffer page 12 is not smaller than the value of the ring end page 10, the value of the CD buffer page 12 is updated to be 0 (that is, 0x000), and, also, the CD buffer flag (CDBufFlg) toggles (from 0 to 1, from 1 to 0) (in a step S5).

FIG. 5 is a block diagram showing connection relationship, in the case where the master is the system controller interface (system controller IF) 3, for example, of the corresponding system buffer page (SysBufPage) 8, address generator 15 and DRAM controller 1. In the figure, A[11:0] is address information (information indicating the specific address in the page) which is provided from the system controller interface 3 to the buffer manager 16. D[7:0] is data which is provided from the system controller interface 3 to the DRAM controller 1 through the data line. The address information (address for specifying the page) of the significant 13 bits of the system buffer page (SysBufPage) 8 is added to the address of the 12 bits of the above-mentioned A[11:0], as shown in the figure. Thus, the address of 24 bits, for accessing the DRAM 2, is generated. Further, a request control unit 3a of the system controller interface 3, based on access signals (CS1B, REB, WEB), generates a request signal (REQ), and accesses the DRAM controller 1. The same arrangement is provided for each of the other masters.

FIG. 6 illustrates a signal flow in the case where decoding processing is performed in the data processing circuit 100 shown in FIG. 1. In the decoding processing, data read out from the recording medium is provided to the data processing circuit 100 via the DSP 19 as CD-DA input and subcode input, and, then, is provided to the AT attachment 18 via the data processing circuit 100 and DRAM 2. This data (approximately 3 kilobytes) is in synchronization with a block synchronizing signal (BSYC), and is stored in the pages indicated by the CD buffer page (CDBufPage) and in the pages indicated by the subcode buffer page (SubBufPage) (see (a), (b), (c), (d) and (e) in the figure). The values stored in the pages indicated by the sector processor buffer page (SPBufPage) correspond to the values stored in the pages which are previous to the pages indicated by the CD buffer page (CDBufPage), respectively, (see (f) and (g) in the figure) because the sector processor performs error detection and so forth using the already-written data. The degree of this page lag may be any degree as long as catching up is prevented.

The system controller interface (system controller IF) 3 stores, in the buffering area, the necessary part (for example, approximately 2 kilobytes) of data which has been processed by the sector processor. For this purpose, the system controller interface 3 performs a reading operation at the value corresponding to the page previous to the page indicated by the sector processor buffer page (SPBufPage), and performs an operation of writing, into the n+1 page of the buffering area, the above-mentioned necessary part of the data which has been processed by the sector processor (see (h) and (i) of the figure). In order to read out the data obtained as the result of the correction being performed and stored in the buffering area, and, then, to provide it to the AT attachment 18, the host interface (host IF) 4 reads out the data from the above-mentioned n+1 page of the buffering page at the transfer commencement address specified by a transfer counter provided in the page controller 14 for the host interface 4 and the HstBufPage1 (which functions as a page specifying buffer for the buffering area at the time of decoding) (see (j) and (k) of the figure). When finishing the processing for the current page, each master outputs the increment (inc) signal so as to cause the respective one of the page controllers 14 to perform page updating processing.

FIG. 7 illustrates a signal flow in the case where encoding processing is performed in the data processing circuit 100 shown in FIG. 1. In the encoding processing, the data provided by the AT attachment 18 is provided to the DSP 19 (EFM encoder) through the data processing circuit and DRAM 2. The host interface (host IF) 4 transfers the data to the page indicated by the host buffer page (HstBufPage0) (see (a) and (b) of the figure). The other masters are controlled so as to complete the processing in a page unit for each ESFS (Encode Subcode Frame Sync) which is a one-sector processing unit outputted by the CD encoder (see (e) of the figure). In order for the sector processor 5 to perform parity-adding processing using the data which was already written by the host interface 4, the sector processor buffer page (SPBufPage) has the value corresponding to the page previous to the page indicated by the host buffer page (HstBufPage0) (see (c) and (d) of the figure).

Then, in order to provide the data obtained as a result of being processed by the sector processor 5 to the DSP 19 (EFM encoder), the CD-DA interface 6 performs a reading operation at the value of the CD buffer page (CDBufPage) corresponding to the page previous to the page indicated by the sector processor buffer page (SPBufPage) (see (f) and (g) of the figure). In (g) of the figure, Trn0, Trn1, . . . represent the data corresponding to the CD-ROM sectors, respectively. Similarly, in order to provide the data obtained as the result of being processed by the sector processor 5 to the DSP 19 (EFM encoder), the subcode interface (subcode IF) 7 performs a reading operation at the value of the subcode buffer page (SubBufPage) corresponding to the page previous to the page indicated by the sector processor buffer page (SPBufPage) (see (h) and (i) of the figure). In (i) of the figure, each of Trn0, Trn1, . . . represents the data corresponding to 96 bytes of the subcode frame.

The EFM encoder performs EFM modulation on the combination of the above-mentioned CD data and subcode data, converts the thus-modulated data into serial data, and outputs the thus-obtained data to a laser pickup (not shown in the figures) so that this data will be written in a recording medium.

Thus, the buffer RAM is divided into the paging area and buffering area, and, at the time of decoding, the data (the amount of which is smaller than the amount of data which was stored in the original page (from approximately 3 kilobytes to approximately 2 kilobytes)) which is needed by the AT attachment is stored in the buffering area. Thereby, the use efficiency of the memory can be very improved.

At the time of encoding, the data provided by the AT attachment 18 is stored in the predetermined pages in the buffer RAM of the DRAM 2, each master accesses the pages and processes this data, in sequence, and, finally, the data to be provided to the EFM encoder is outputted serially. At this time, originally, in each page, all of the subcode data is stored together with the user data which is the main data. The subcode data consists of the data expressed by the symbols such as P, Q, R, S, T, U, V and W. In particular, the subcode Q data is information relating to the time, and can be automatically generated. However, in order to generate the subcode Q data in the page of the paging area, it is necessary to access this page frequently. As a result, the frequency of access arbitration between the masters increases, and the processing-speed decreases. Furthermore, in an arrangement in which a circuit for storing this subcode Q data in the page is needed, the circuit becomes complicated. Further, the subcode P data is information, for example, relating to a portion between two adjacent tunes, is either 0 or 1 in the subcode data (96 bytes) in one sector, and can be generated automatically. However, it is necessary to perform frequent access in order to thus store the same data in the 96 bytes. As a result, the frequency of access arbitration between the masters increases, and the processing speed decreases. Furthermore, in an arrangement in which a circuit for storing this subcode P data in the page is needed, the circuit becomes complicated.

How to utilize the above-mentioned buffering area also at the time of encoding will now be described. FIG. 8 shows an arrangement in which the original data of the subcode Q data and subcode P data of the subcode data is generated in the buffering area (this data being referred to data for automatic generation, and the reference numeral 30 being given thereto in the figure), and, at the time of encoding, this data for automatic generation is outputted together with the other subcode portion. The data for automatic generation 30 includes Cont/Adr for providing a meaning to each group (TNO, INDEX, or the like) and so forth, TNO having information such as which track number the first tune starts from, for example, INDEX having predetermined information, relative time (RMIN, RSEC, RFRAME), ZERO, absolute time (AMIN, ASEC, AFRAME), MODE, REPEAT, POINT, and PMSB. One second corresponds to 75 frames (sectors). The absolute time can be automatically generated only as a result of the start time being determined. The relative time can also be automatically generated only as a result of the initial value being determined.

This automatic generation will now be described in detail using FIGS. 8, 9A, 9B, 9C, 9D, 9E, 10A, 10B and 10C. FIG. 9A shows the arrangement of the buffer RAM, FIG. 9B shows the arrangement of one page, FIG. 9C shows the arrangement of the buffering area for the subcode data (in which area the commands for obtaining the data for automatic generation 30 are written), FIG. 9D shows the data for automatic generation 30, and FIG. 9E shows the subcode data in the page. FIG. 10A shows, as does FIG. 9E, the subcode data in the page, FIG. 10B shows, as does FIG. 9D, the data for automatic generation, and FIG. 10C shows the arrangement of output data which is obtained as a result of the data for automatic generation 30 being incorporated with the other subcode portion (P, R through W or R through W).

(Subcode Q Data Generation)

The subcode Q data for each frame is generated using the data for automatic generation 30. The data for automatic generation 30 is formed in a unit of 16 bytes (offset: 0x00 through 0x0F). Because FIG. 8 shows the case at the time of encoding, the areas 0x0A and 0x0B relating to CRC are omitted in the figure.

In an RTIM counter 31, a ZERO counter 32 and an ATIM counter 33, the data of the offsets 0x03 through 0x09 (RMIN through AFRAME) is stored as the initial values when load=1 (a predetermined bit in the 8-bit data stored in MODE is 1). On the other hand, when load=0 (the predetermined bit in the 8-bit data stored in MODE is 0), depending on whether a predetermined bit of the 8-bit data stored in MODE is 0 or 1 (or, 1 or 0), incrementing/decrementing is performed for each frame. When REPEAT=0 where REPEAT is decremented for each frame, processing is performed on the data for automatic generation in the buffering area indicated by the n (ring end page)+1 and POINT (see FIGS. 9A-9E).

When RTIMselect=1 (a predetermined bit in the 8-bit data stored in MODE is 1), a selector 34 selects the value of the RTIM counter 31, and outputs the selected value as data to be used for forming encode subcode Q data 37.

When ZEROselect=1 (a predetermined bit in the 8-bit data stored in MODE is 1), a selector 35 selects the value of the ZERO counter 32, and outputs the selected value as data to be used for forming the encode subcode Q data 37.

When ATIMselect=1 (a predetermined bit in the 8-bit data stored in MODE is 1), a selector 36 selects the value of the ATIM counter 33, and outputs the selected value as data to be used for forming the encode subcode Q data 37.

Then, the encode subcode Q data 37 is latched for each frame, and a CRC calculator 39 calculates CRC data 38 for the thus-latched data, and appends the CRC data 38 to the encoded subcode Q data 37.

(Subcode P Data Generation)

The subcode P data is generated using the data for automatic generation 30 stored in the buffering area or is generated using the data stored in the paging area. Specifically, when 'use PMSB'=1 (a predetermined bit in the 8-bit data stored in MODE is 1), a selector 43 for outputting the subcode P data outputs the value of PMSB (7 bits) as the encode subcode P data. When 'use PMSB'=0 (the predetermined bit in the 8-bit data stored in MODE is 0), the selector 43 outputs the value of P (selected by a selector 44) stored in the paging area 45 as the encode subcode P data.

The other subcode data (R through W) is selected by selectors 42 and 44 from the 96 bytes in accordance with the value of an offset counter 41 which performs a counting operation every request (ESUBREQB) from the EFM encoder 40. The thus-selected one byte is outputted to the EFM encoder 40 as encode subcode serial data.

Thus, in the arrangement disclosed in Japanese Laid-Open Patent Application No. 10-302389, also at the time of encoding, the above-mentioned buffering area is utilized and the subcode P data and subcode Q data are automatically generated, and the data for this automatic generation is appended to the other subcode data when the data for the automatic generation is outputted. Thereby, decrease in the processing speed and complication of the circuit in the case where the subcode P data and subcode Q data are stored in the paging area can be avoided.

For Adr in the data for automatic generation 30 shown in FIG. 8, several types are set. However, the meanings are different due to differences in the standards of CD, CD-R, and so forth. For example, each of Adr0 and Adr1 means that the subcode data includes time data, Adr2 means that the subcode data includes UPC/EAN-Code, Disk Identification, Adr3 means that the subcode data includes ISR code (country code, year code, owner code, RID code, Skip Track), and Adr5 means that the subcode data includes a code indicating disk special information (Skip Time Internal) (see the so-called red book and orange book).

For example, a case where one UPC/EAN-Code (Adr2) is inserted every 100 pieces of time data is considered. Then, the commands written in the 'POINTS' of the buffering area shown in FIG. 9C are written as shown in FIG. 11A or 11B. In the command on the first line in FIG. 11A, Adr is Adr0, 1, and "100" is set in "REPEAT". Therefore, the above-described processing of automatically generating the subcode Q data using the counter is repeated 100 times. After these 100 times of processing, jumping is performed to the address '1' indicated by "POINT". The command at the address '1', to which the jumping is performed, is Adr2, that is, the command indicates generation of UPC/EAN-Code. In the generation of the subcode Q data of this Adr2, the above-described processing of automatic generation is not performed. That is, in the case where one UPC/EAN-Code (Adr2) is inserted every 100 pieces of time data, the automatic generation of the subcode Q data is repeated 100 times, and, then, is stopped. Then, after the generation of the subcode Q data of Adr2, an initial value is input to the counter again, and, then, the processing of automatic generation is started again in the generation of the subcode Q data of Adr0, 1.

This means that, even in a case where it is planed that a total of 300 pieces of time data are to be generated, it is not possible to write the command in which "REPEAT" is set to be "300". As shown in FIG. 11A, it is forced to write the command in which "REPEAT" is set to be "100" for Adr0, 1, and the command for Adr2 alternately, repeatedly. As a result, the description of commands is complicated. Further, in a case where simplification of description is attempted as a result of commands having common Adr being collected as shown in FIG. 11B, description of destinations to which jumping is performed is complicated.

Further, there is the standard in which the subcode P data toggles at 2 Hz in a case where music data or the like is handled. Because one second corresponds to 75 frames (sectors), data setting of subcode P data of the data for automatic generation 30 is performed every 75/4 sectors. That is, it is necessary to count the number of sectors, and to access the memory at the time the predetermined number has been counted. In other words, although the processing of automatic generation of the subcode Q data can be performed 100 times as described above when the condition where the subcode P data toggles at 2 Hz is not set, the processing of automatic generation of the subcode Q data can not even be performed 100 times when the condition where the subcode P data toggles at 2 Hz is set.

The above-mentioned problems occur not only in the case where Adr is Adr2, but also in the case where Adr is Adr3 or Adr5.

SUMMARY OF THE INVENTION

An object of the present invention is to further reduce the number of memory access operations by preventing repetitive cycles of generation of the time information (data of Adr0 or 1) from being interrupted in the case where information (data of Adr2, Adr3 or Adr5) other than the time information (data of Adr0 or 1) is generated (inserted) in the respective timings during the cycles of generation of the time information (data of Adr0 or Adr1).

A subcode-data generating circuit, according to the present invention, which circuit generates subcode data including subcode component data which indicates any one of time information and information other than the time information, comprises:

a first generating portion for automatically generating the subcode component data which indicates the time information;

a second generating portion for automatically generating the subcode component data which indicates the information other than the time information; and a selecting portion which selects one of the outputs of the first and second generating portions.

In this arrangement, the first and second generating portions operate separately. Thereby, regardless of whether or not the subcode component data which indicates information other than the time information is generated, the first generating portion can generate the data incrementally. The second generating portion separately generates the subcode component data, without affecting the above-mentioned incremental data generation, and the output of the second generating portion is automatically inserted in desired timing by the selecting portion. Thereby, it is possible to remarkably reduce the frequency of operations of accessing the memory.

A subcode-data generating circuit, according to another aspect of the present invention, which circuit generates subcode data including subcode component data which indicates any one of time information and information other than the time information, comprises:

a first generating portion for automatically generating the subcode component data which indicates the time information;

a second generating portion for automatically generating the subcode component data which indicates the information other than the time information;

a selecting portion which selects one of the outputs of the first and second generating portions; and a memory in which commands for automatic generation of the subcode component data are written, wherein the commands include first commands for automatic generation of the subcode component data which indicates the time information, which first commands are written collectively in a first area of the memory, and second commands for automatic generation of the subcode component data which indicates the information other than the time information, which second commands are written collectively in a second area of the memory.

In a case where a single generating portion handles both time information and information other than the time information, generation cycles of the time information are interrupted when the generating portion handles the information other than the time information, as described above. Further, as shown in FIGS. 11A and 11B, description of commands into the memory is complicated. Therefore, when it is assumed that the description into the memory is included in the subcode-data generating circuit, manufacture of the subcode-data generating circuit is complicated. In contrast to this, in the above-described arrangement according to the other aspect of the present invention, description of commands into the memory is easy as a result of collective description. Therefore, when it is assumed that the description of commands into the memory is included in the subcode-data generating circuit, manufacture of the subcode-data generating circuit is easy.

A subcode-data generating circuit, according to another aspect of the present invention, which circuit generates subcode data including subcode component data, the state of which alternates between a high state and a low state at a predetermined period, comprises:

a toggle generating portion which independently generates data, the state of which alternates between the high state and the low state at the predetermined period; and a selecting portion which selects one of the output of the toggle generating portion and data, the state of which alternates between the high state and the low state at the predetermined period based on a number of sectors based on original data of the subcode component data.

In the related art, when it is requested to cause the subcode P data of music data or the like to toggle at 2 Hz at the time of encoding, it is not possible to avoid managing the number of sectors (75 sectors corresponding to 1 second) and setting data every toggling. However, as a result of providing the toggle generating portion which independently generates data, the state of which alternates between the high state and the low state at the predetermined period, the above-mentioned problem can be avoided.

Thus, according to the present invention, when the subcode data including the subcode component data which indicates any one of the time information and the information other than the time information is generated, it is possible to prevent the subcode-component-data automatic generation cycles from being interrupted, and, also to improve the data processing speed as a result of reducing the memory access frequency. Further, because description of commands is easy, when it is assumed that the description of commands into the memory is included in the subcode-data generating circuit, manufacture of the subcode-data generating circuit is easy. Further, it is possible to generate the subcode component data which toggles at a predetermined frequency without increase in the memory access frequency.

Other objects and further features of the present invention will become more apparent from the following detailed description when read in conjunction with the accompanying drawings.

BRIEF DESCRIPTION OF THE DRAWINGS

FIGS. 9A, 9B, 9C, 9D and 9E show an arrangement of a buffering area of the buffer RAM shown in FIG. 2;

DETAILED DESCRIPTION OF THE PREFERRED EMBODIMENT

Figure 1:
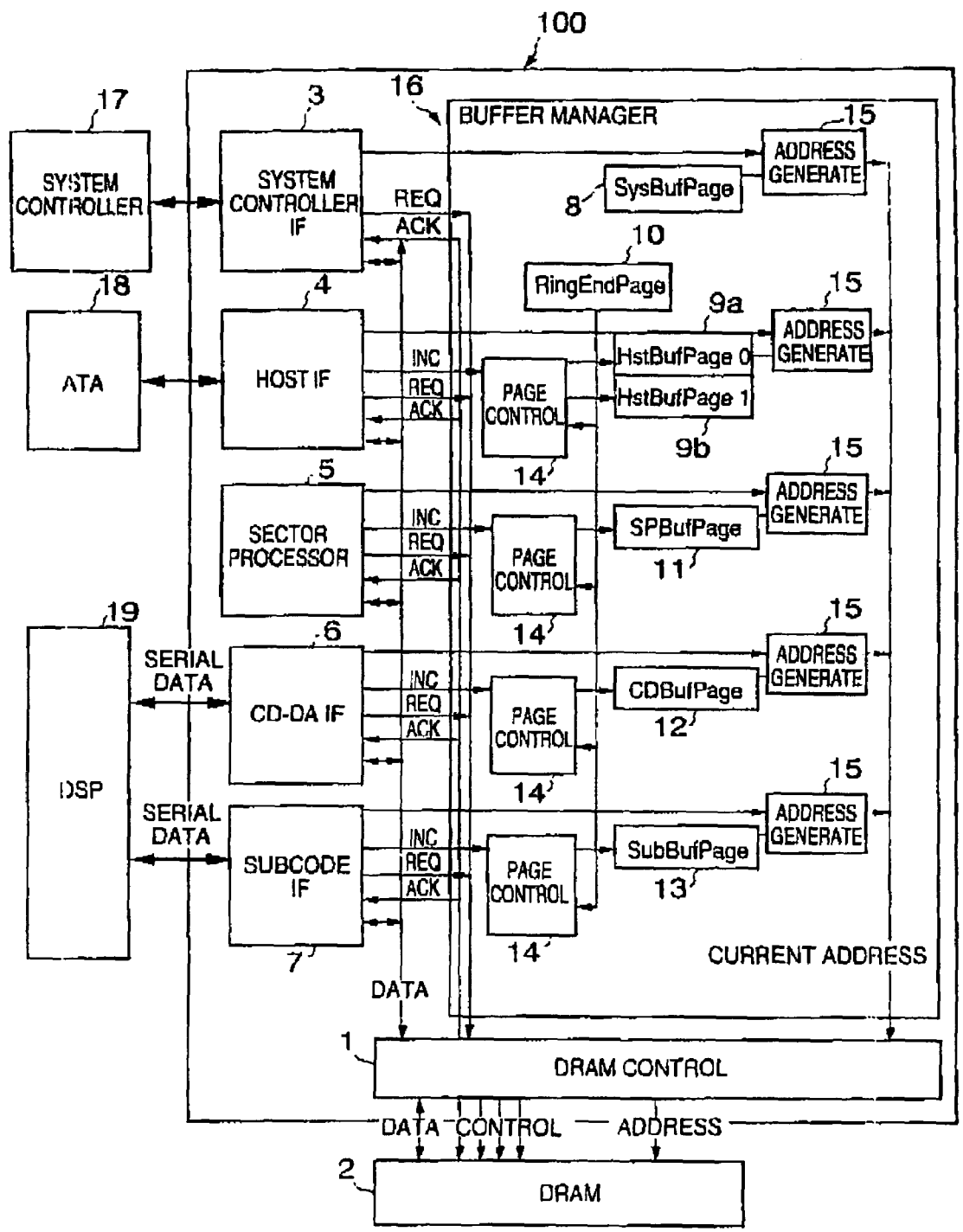
FIG. 1 shows a block diagram of a data processing circuit in the related art.
Figure 2:
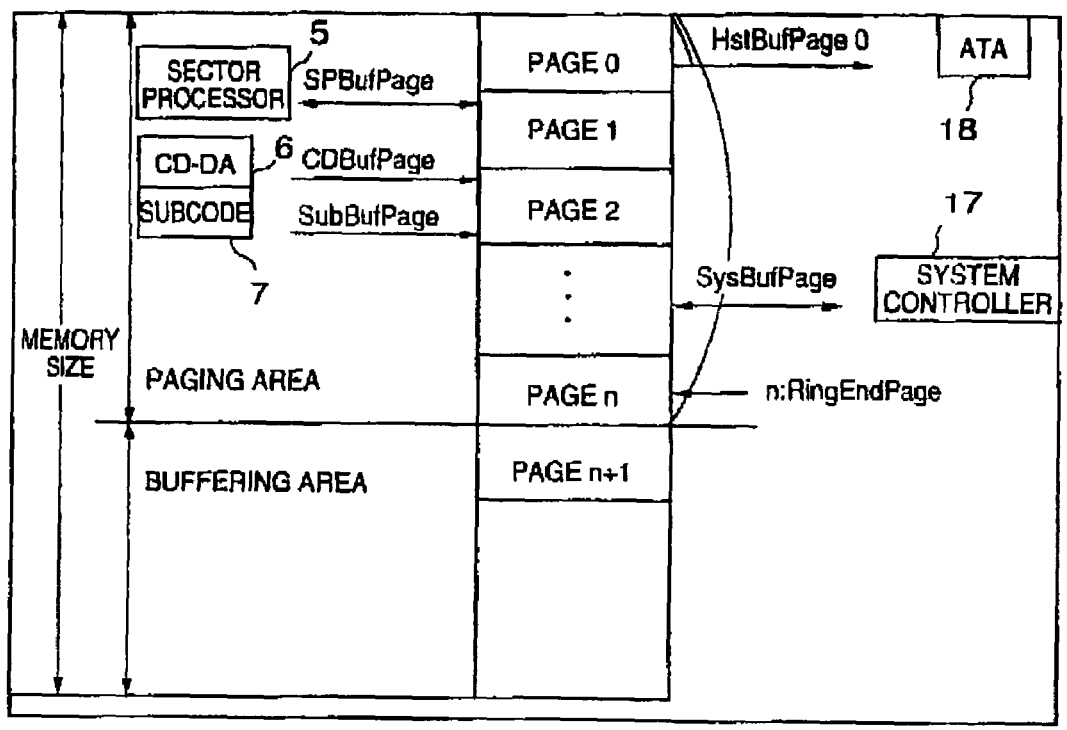
FIG. 2 illustrates an arrangement of a buffer RAM of the data processing circuit shown in FIG. 1.
Figure 3:
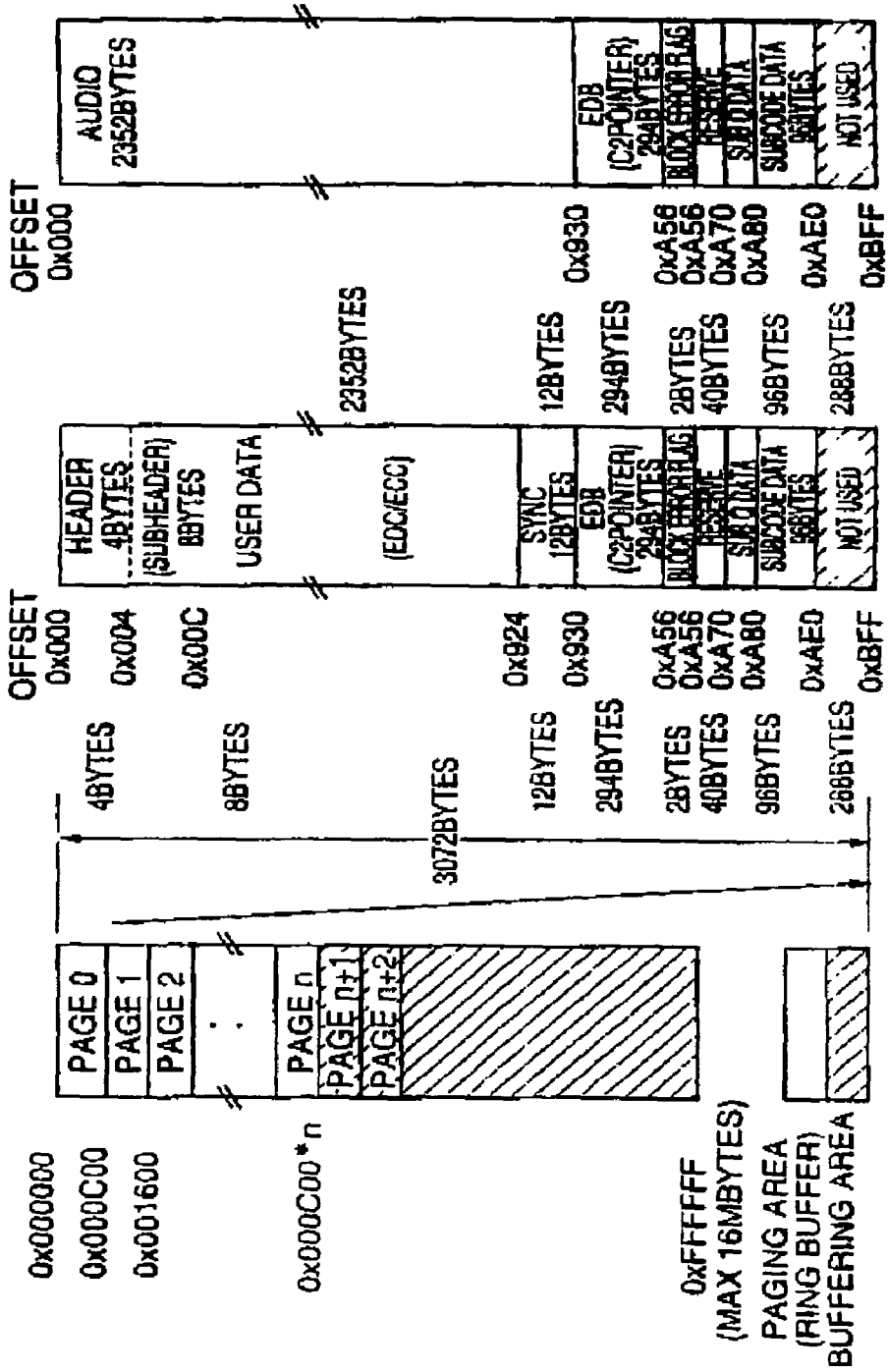
FIGS. 3A, 3B and 3C illustrate examples of formatting of the buffer RAM shown in FIG. 2.
Figure 4:
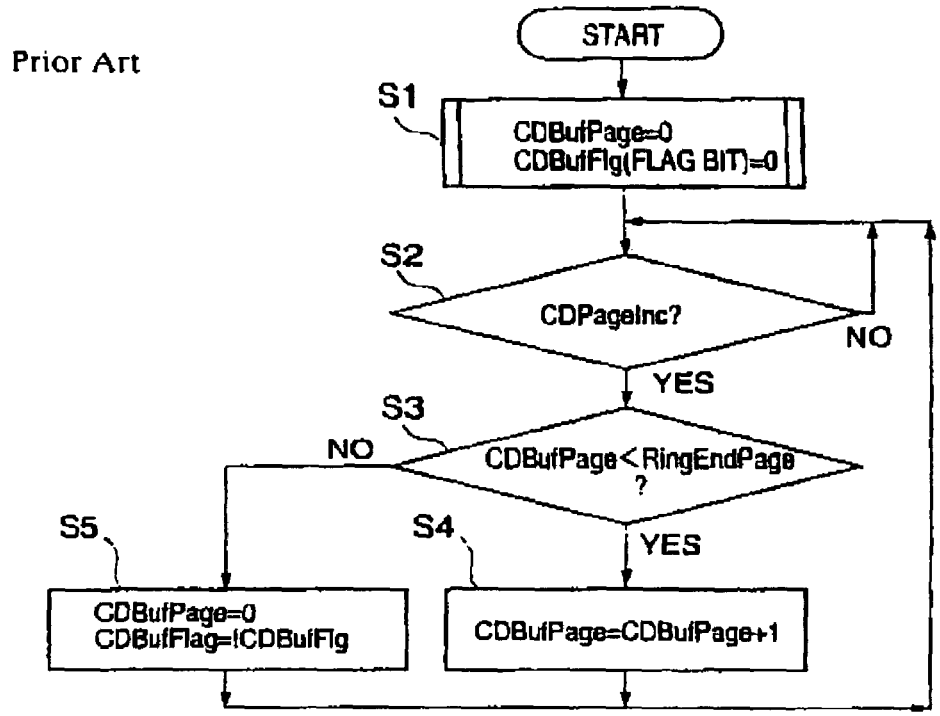
FIG. 4 is a flow chart showing the contents of page-updating control of the buffer RAM shown in FIG. 2.
Figure 5:
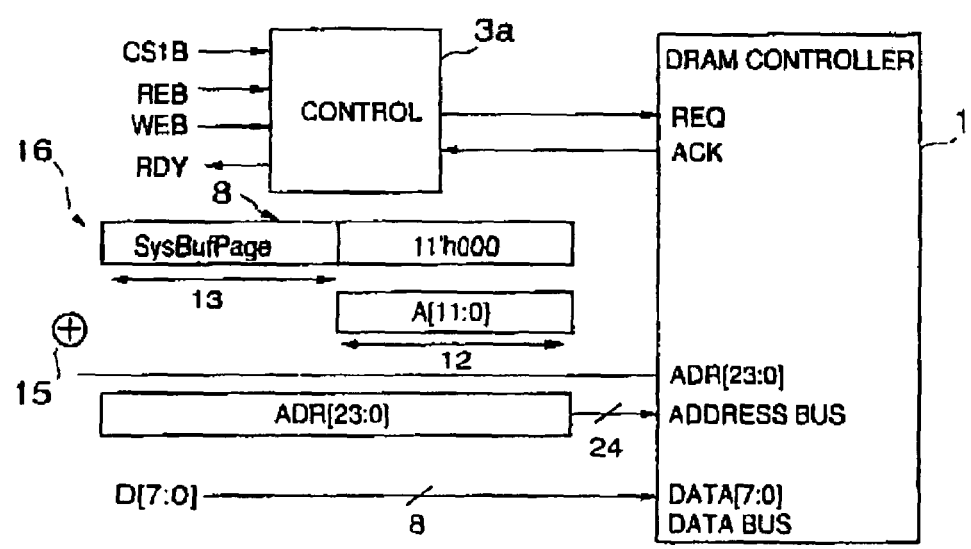
FIG. 5 is a block diagram showing relationship between a system controller interface, a DRAM controller and a buffer manager in the data processing circuit shown in FIG. 1.
Figure 6:
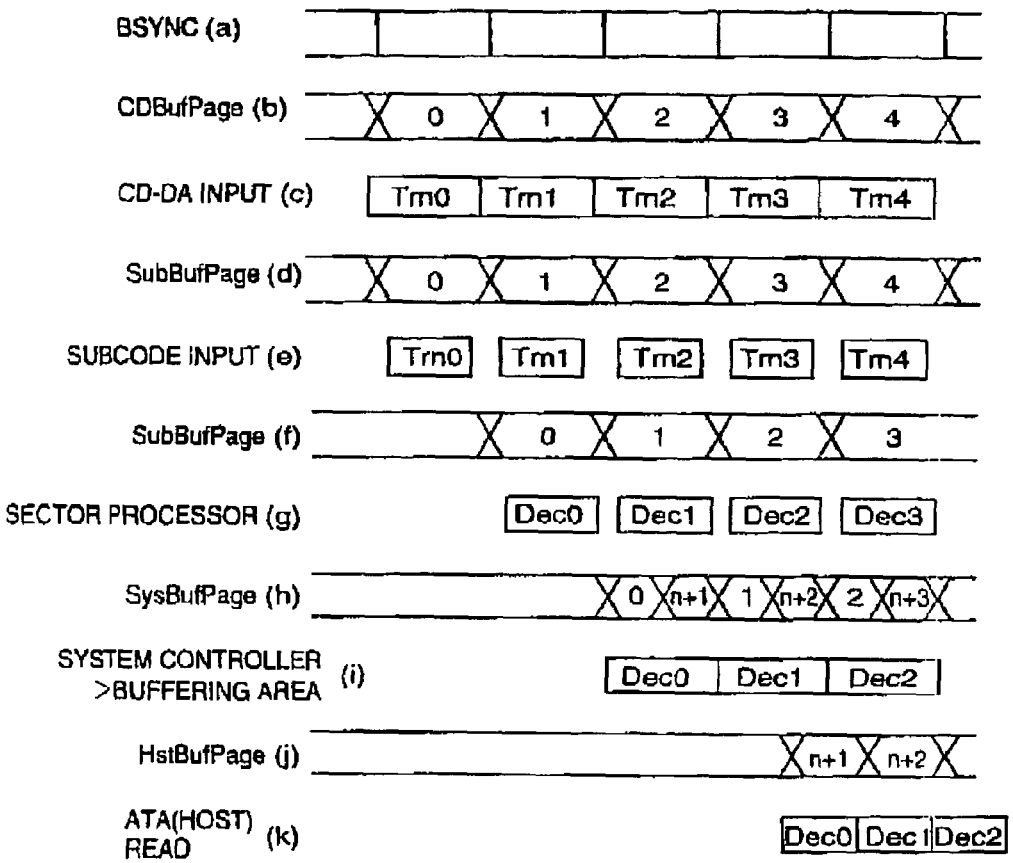
FIG. 6 shows a signal flow at the time of decoding in the data processing circuit shown in FIG. 1.
Figure 7:
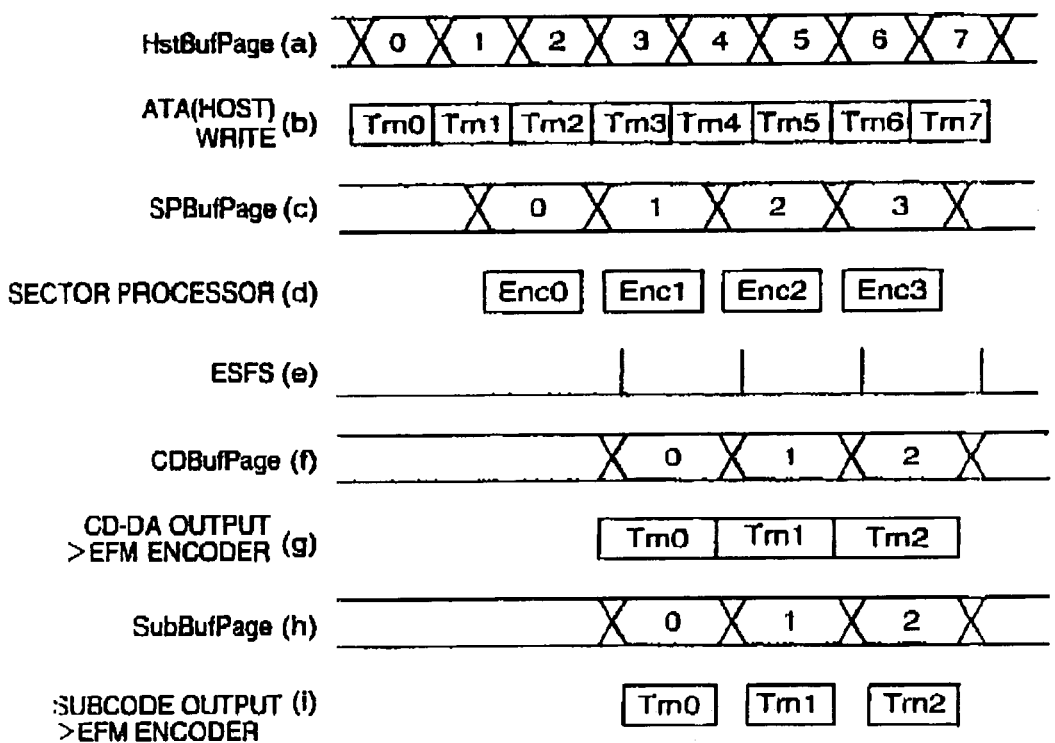
FIG. 7 shows a signal flow at the time of encoding in the data processing circuit shown in FIG. 1.

A subcode-data generating circuit in an embodiment of the present invention is used in a data processing circuit used for CD-R, CD-RW, or the like. The arrangement of the data processing circuit is the same as that shown in FIG. 1. Therefore, for the sake of simplification of description, the description of the data processing circuit is omitted.

Figure 8:
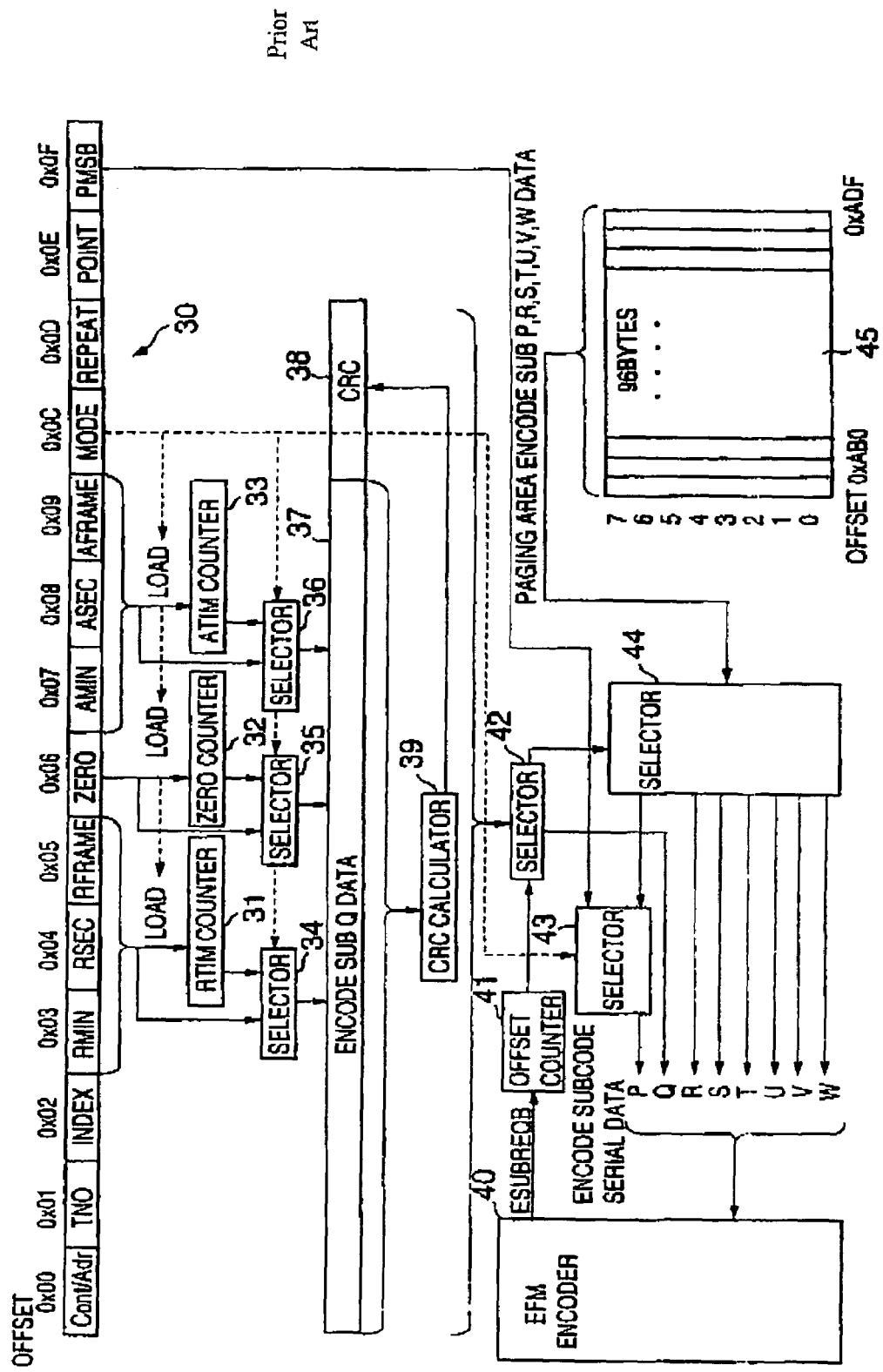
FIG. 8 illustrates an arrangement in which subcode Q data and subcode P data are generated in the data processing circuit shown in FIG. 1.
Figure 10A:
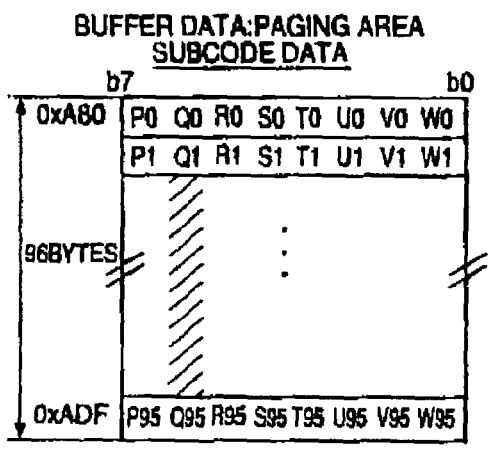
FIGS. 10A, 10B and 10C illustrate how the subcode P data and subcode Q data generated in the data processing circuit shown in FIG. 1 are incorporated with the other subcode component data.
Figure 10C:
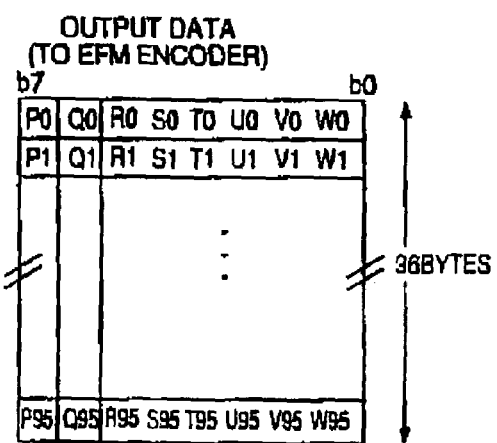
Figure 10B:
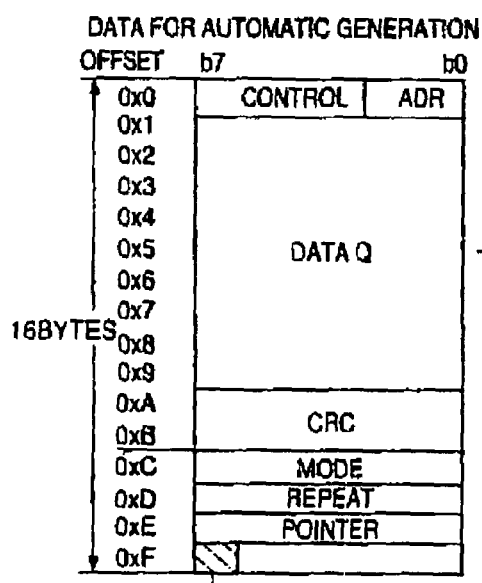
Figures 11A, 11B:
FIGS. 11A and 11B illustrate examples of description of commands in the data processing circuit shown in FIG. 1.
Figure 12:
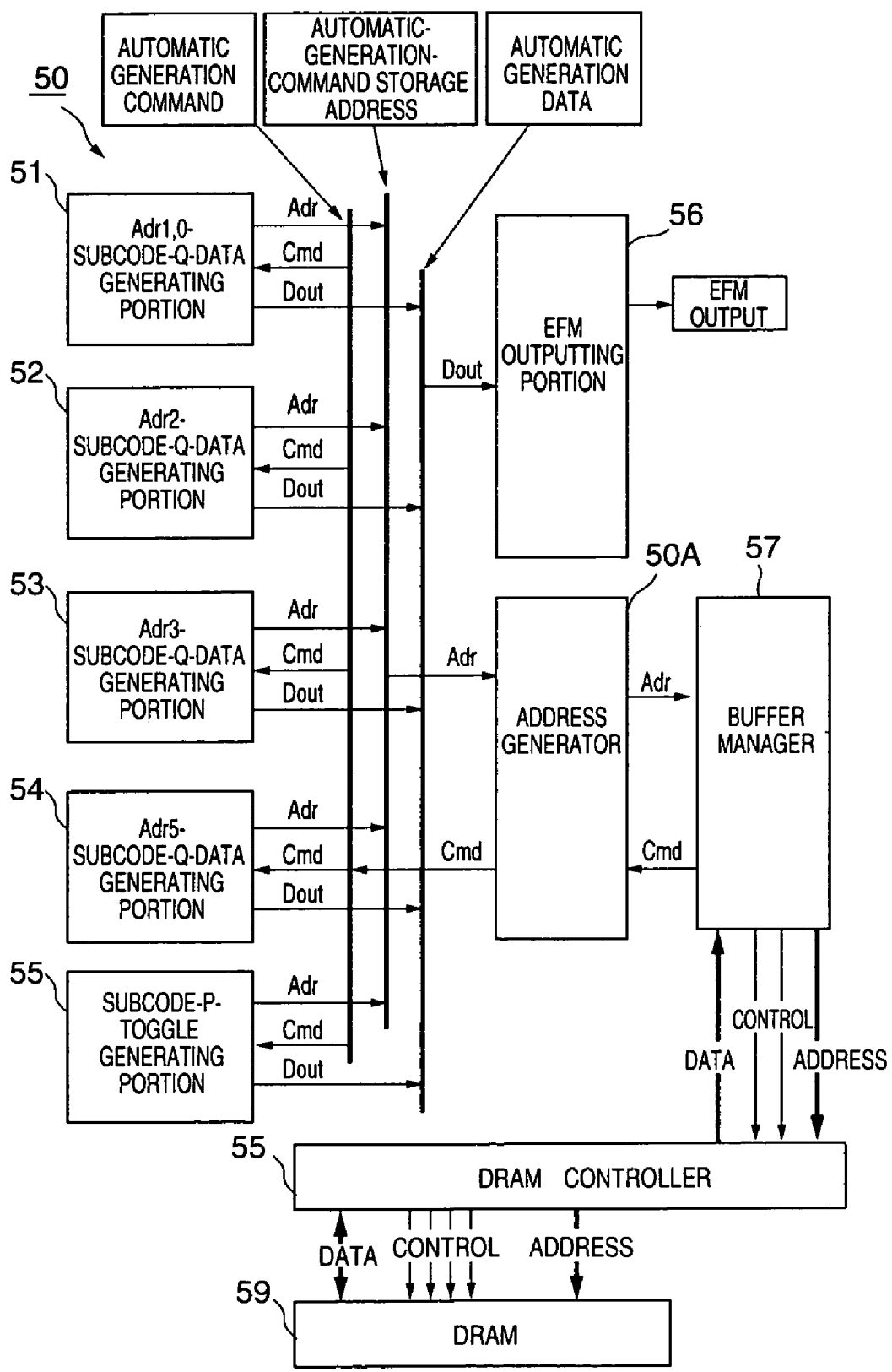
FIG. 12 shows a general block diagram of a subcode-data generating circuit in an embodiment of the present invention.
Figure 13:
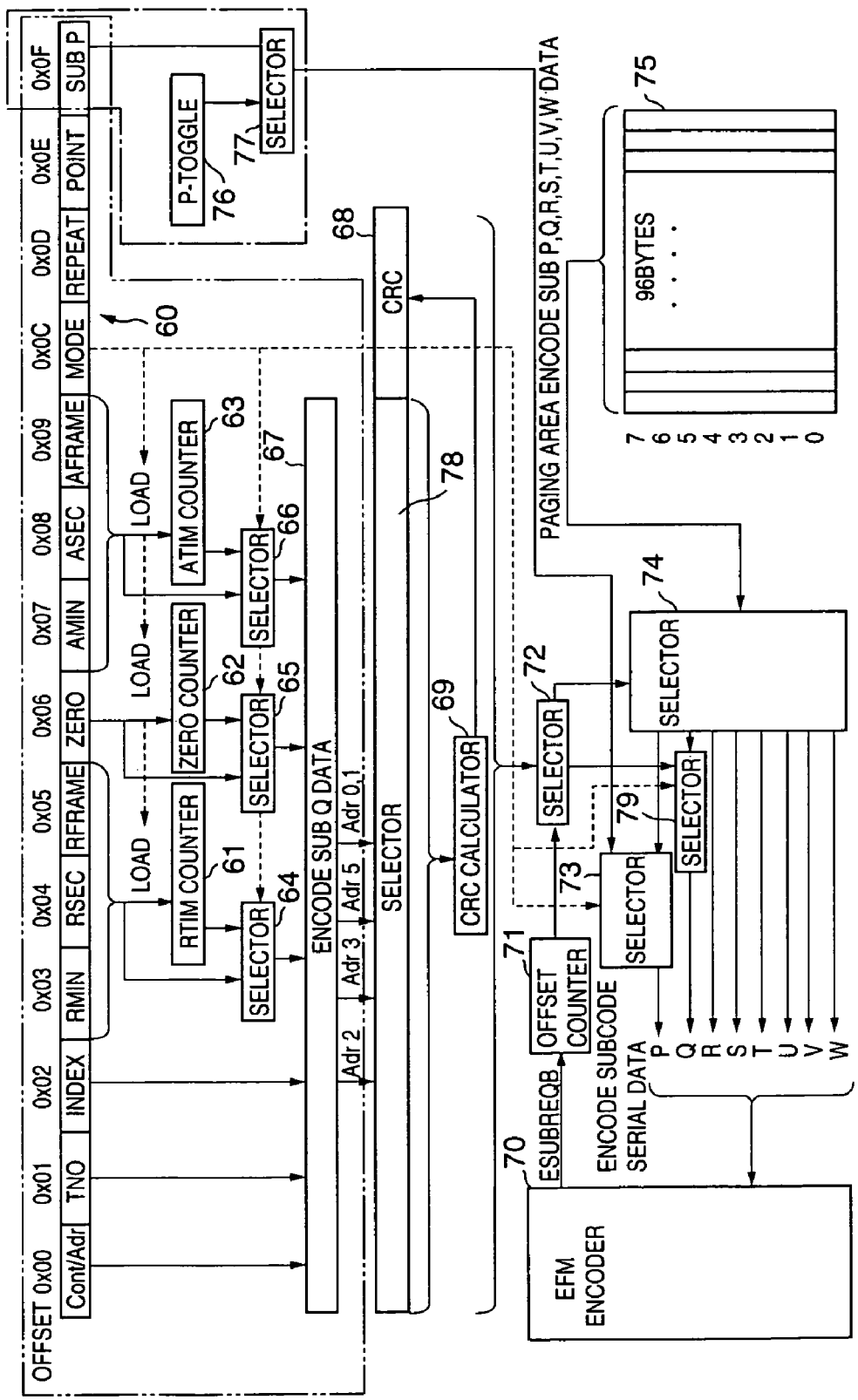
FIG. 13 shows an arrangement in which the subcode Q data and subcode P data are generated.
Figures 14, 15A, 15B:
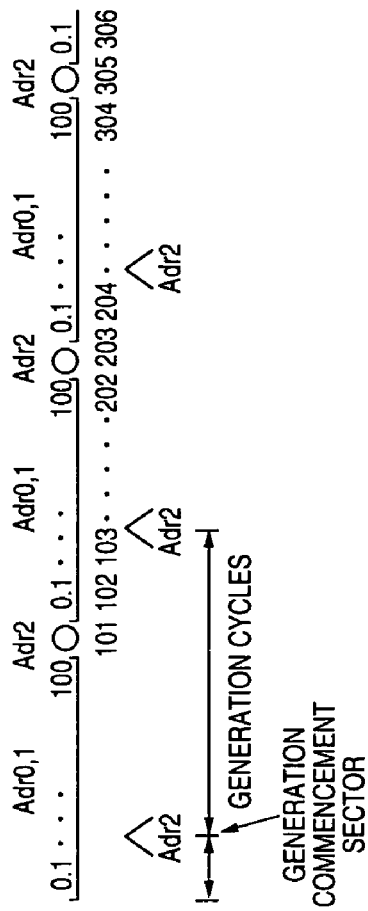
FIG. 14 illustrates an example of description of commands in the embodiment of the present invention.
FIGS. 15A and 15B illustrate timing in which subcode data of Adr2 is inserted during successive output of subcode data of Adr0, 1.

The embodiment of the present invention will now be described based on FIGS. 12 through 15B. FIG. 12 is a circuit diagram showing a general arrangement of the subcode-data generating circuit in this embodiment. FIG. 13 corresponds to FIG. 8 used in the description of the related art. FIG. 13 shows an Adr0, 1-subcode-Q-data generating portion 51, shown in FIG. 12, and a peripheral circuit. FIG. 14 illustrates an example of description of commands in this embodiment. The commands are written in the 'POINTS' of the buffering area shown in FIG. 9C used in the description of the related art. FIGS. 15A and 15B show examples of timings in which the subcode data of Adr2 is inserted during successive output of the subcode data of Adr0, 1. (The upper portion of FIG. 15A shows the timings in the case of the related art in accordance with the commands shown in FIG. 11A, and the lower portion of FIG. 15A shows the timings in a case of the embodiment of the present invention in accordance with the commands shown in FIG. 14.)

As shown in FIG. 12, the subcode-data generating circuit include a subcode-component-data generating circuit group 50, an address generator 50A, a buffer manager 57, a DRAM controller 58, a DRAM 59 and an EFM outputting portion 56. The subcode-component-data generating circuit group 50 and address generator 50A constitute a subcode interface which corresponds to the subcode interface 7 shown in FIG. 1. The buffer manager 57 corresponds to the buffer manager 16 shown in FIG. 1. Further, the DRAM controller 58 and DRAM 59 correspond to the DRAM controller 1 and DRAM 2, shown in FIG. 1, respectively. The EFM outputting portion 56 corresponds to an EFM encoder 70 shown in FIG. 13.

The subcode-component-data generating circuit group 50 includes an Adr0, 1-subcode-Q-data generating portion 51, an Adr2-subcode-Q-data generating portion 52, an Adr3-subcode-Q-data generating portion 53, an Adr5-subcode-Q-data generating portion 54, and a subcode-P-toggle generating portion 55. These generating portions 51, 52, 53, 54 and 55 have separate circuit arrangements, and operate separately.

The respective generating portions 51, 52, 53, 54 and 55 generate and output signals (Adr) indicating addresses. The address generator 50A selects an appropriate one of these signals (Adr) indicating addresses transmitted from the respective generating portions 51, 52, 53, 54 and 55, and provides the thus-selected signal (Adr) to the buffer manager 57. The buffer manager 57 receives signals from the respective masters, i.e., a controller interface, a host interface, a sector processor, a CD-DA interface (not shown in FIG. 12, corresponding to those 3, 4, 5, 6, shown in FIG. 1, respectively) and the subcode interface which includes the generating portions 51, 52, 53, 54 and 55, and address generator 50A. Then, the buffer manager performs arbitration, and selects an appropriate one of these signals, and provides the selected signal to the DRAM controller 58. Thereby, the appropriate one of these masters accesses the DRAM 59 and obtains appropriate data from the DRAM 59, via the buffer manager 57 and DRAM controller 58.

When the subcode data is to be generated and outputted to the EFM outputting portion 56, an appropriate one of the signals (Adr) transmitted from the respective generating portions 51, 52, 53, 54 and 55 is selected by the address generator 50A. The selected signal is then selected by the buffer manager 57, and, thereby, the generating portion, the signal (Adr) of which has been selected by the address generator 50A, can access the DRAM 59 via the address generator 50A, buffer manager 57 and DRAM controller 58. Thus, the appropriate generating portion accesses the DRAM 59 at an address, such as that shown in FIG. 14, so as to obtain the command (Cmd) written at this address. Then, in accordance with the thus-obtained command, this generating portion generates and outputs appropriate encode subcode data (Dout) to the EFM outputting portion 56. The EFM (Eight-to-Fourteen Modulation) outputting portion 56 converts this encode subcode data from 8-bit data to 14-bit data, and outputs the thus-obtained data serially.

The Adr0, 1-subcode-Q-data generating portion 51 is a subcode-component-data automatic generating portion which automatically generates the subcode component data in a case where the subcode component data indicates time information when Adr is Adr0 or 1, and has the circuit arrangement shown in the portion defined by the chain double-dashed line in FIG. 13. (The subcode Q data and subcode data, each of which indicates the time information when Adr is Adr0 or Adr1, are referred to as the subcode Q data of Adr0, 1 and subcode data of Adr0, 1, respectively.) Data for automatic generation 60 shown in FIG. 13 is stored in a buffering area of the DRAM 59, and is used for generating encode subcode Q data of Adr0, 1, 2, 3 or 5 described later. The arrangement of the DRAM 59 is the same as that shown in FIGS. 2 and 9A-9E.

In an RTIM counter 61, a ZERO counter 62 and an ATIM counter 63, the data of the offsets 0x03 through 0x09 (RMIN through AFRAME) is stored as initial values, when load=1 (a predetermined bit of the 8-bit data stored in MODE is 1). On the other hand, when load=0 (the predetermined bit of the 8-bit data stored in MODE is 0), depending on whether a predetermined bit of the 8-bit data stored in MODE is 0 or 1 (or, 1 or 0), incrementing/decrementing of the values of the RTIM counter 61, ZERO counter 62 and ATIM counter 63 is performed for each frame.

When RTIMselect=1 (a predetermined bit of the 8-bit data stored in MODE is 1), a selector 64 selects the value of the RTIM counter 61, and outputs the selected value as data to be used for forming encode subcode Q data 67.

When ZEROselect=1 (a predetermined bit of the 8-bit data stored in MODE is 1), a selector 65 selects the value of the ZERO counter 62, and outputs the selected value as data to be used for forming the encode subcode Q data 67.

When ATIMselect=1 (a predetermined bit of the 8-bit data stored in MODE is 1), a selector 66 selects the value of the ATIM counter 63, and outputs the selected value as data to be used for forming the encode subcode Q data 67.

The Adr2-subcode-Q-data generating portion 52 is a subcode-component-data automatic generating portion which automatically generates the subcode component data in a case where the subcode component data indicates information other than the time information, and generates the encode subcode Q data 67 from the data for automatic generation 60 in which Adr is Adr2 (in which UPC/EAN-Code has been written). (The subcode Q data and subcode data, each of which indicates the information other than the time information in accordance with the fact that Adr is Adr2 in the data for automatic generation 60, are referred to as the subcode Q data of Adr2 and subcode data of Adr2, respectively.) Further, by setting of a generation commencement sector and a number of generation cycles (see FIG. 15B), the Adr2-subcode-Q-data generating portion 52 generates a timing signal for insertion of the encode subcode Q data 67 of Adr2, and provides the timing signal to a selector 78. Therefore, the circuit arrangement of the Adr2-subcode-Q-data generating portion 52 is obtained as a result of deleting the counters 61, 63 and the selectors 64, 66 from, and adding a circuit, which generates the timing signal for insertion of the encode subcode Q data 67, to the circuit arrangement shown in the portion defined by the chain double-dashed line in FIG. 13. The circuit which generates the timing signal for insertion of the encode subcode Q data 67 includes, for example, a first portion (comparison circuit) which determines whether or not a first count value which indicates the number of generated subcode data of Adr0, 1 becomes the value of the preset generation commencement sector, and a second portion (comparison circuit) which determines whether or not a second count value, which indicates the number of subcode data of Adr0, 1, generated after the first count value became the value of the generation commencement sector, becomes the preset number of generation cycles. The above-mentioned first portion generates and provides the timing signal to the selector 78 when the above-mentioned first count value becomes the value of the above-mentioned generation commencement sector, and the above-mentioned second portion generates and provides the timing signal to the selector 78 when the above-mentioned second count value becomes the preset number of generation cycles. Thereby, as shown in FIGS. 15A and 15B, during the successive output of the subcode data of Adr0, 1, the subcode data of Adr2 is inserted when the above-mentioned first count value becomes the generation commencement sector, and, then, is inserted when the above-mentioned second count value becomes the number of generation cycles. Further, in this embodiment, because the description of the commands are that shown in FIG. 14, the initial value of an address generating circuit included in the Adr2-subcode-Q-data generating portion 52 is "10". However, the arrangement of the description of commands is not limited to that shown in FIG. 14, but may be arbitrarily set by a user for efficient utilization of the buffering area and simplification of the description of commands. In correspondence with the setting of the arrangement of the description of commands, the above-mentioned initial value of the address generating circuit should be set by the user. For example, although the commands for Adr2 start from the address "10" in FIG. 14, it is also possible to perform setting such that the commands for Adr2 start from the address "4". In this case, the above-mentioned initial value of the address generating circuit should be "4". Further, the information indicating the generation commencement sector and the number of generation cycles may be set by the user in description of commands for Adr2.

The Adr3-subcode-Q-data generating portion 53 is a subcode-component-data automatic generating portion which automatically generates the subcode component data in a case where the subcode component data indicates information other than the time information, and generates the encode subcode Q data 67 from the data for automatic generation 60 in which Adr is Adr3. (The subcode Q data and subcode data, each of which indicates the information other than the time information in accordance with the fact that Adr is Adr3 in the data for automatic generation 60, are referred to as the subcode Q data of Adr3 and subcode data of Adr3, respectively.) Further, by setting of a generation commencement sector and a number of generation cycles, the Adr3-subcode-Q-data generating portion 53 generates the timing signal for insertion of the encode subcode Q data 67 of Adr3, and provides a timing signal to the selector 78. Therefore, the circuit arrangement of the Adr3-subcode-Q-data generating portion 53 is obtained as a result of deleting the counters 61, 63 and the selectors 64, 66 from, and adding a circuit, which generates the timing signal for insertion of the encode subcode Q data 67, to the circuit arrangement shown in the portion defined by the chain double-dashed line in FIG. 13. The circuit which generates the timing signal for insertion of the encode subcode Q data 67 includes, for example, a first portion (comparison circuit) which determines whether or not a first count value which indicates the number of generated subcode data of Adr0, 1, becomes the value of the preset generation commencement sector, and a second portion (comparison circuit) which determines whether or not a second count value which indicates the number of subcode data of Adr0, 1, generated after the first count value became the value of the generation commencement sector, becomes the preset number of generation cycles. Thereby, during the successive output of the subcode data of Adr0, 1, the subcode data of Adr3 is inserted when the above-mentioned first count value becomes the value of the generation commencement sector, and, then, is inserted when the above-mentioned second count value becomes the number of generation cycles. Further, in this embodiment, because the description of the commands is that shown in FIG. 14, the initial value of an address generating circuit included in the Adr3-subcode-Q-data generating portion 53 is "30". However, the arrangement of the description of commands is not limited to that shown in FIG. 14, but may be arbitrarily set by the user for efficient utilization of the buffering area and simplification of the description of commands. In correspondence with the setting of the arrangement of the description of commands, the above-mentioned initial value of the address generating circuit should be set by the user. For example, although the commands for Adr3 start from the address "30" in FIG. 14, it is also possible to perform setting such that the commands for Adr3 start from the address "4". In this case, the above-mentioned initial value of the address generating circuit should be "4". Further, the information indicating the value of the generation commencement sector and the number of generation cycles may be set by the user in description of commands for Adr3.

The Adr5-subcode-Q-data generating portion 54 is a subcode-component-data automatic generating portion which automatically generates the subcode component data in a case where the subcode component data indicates information other than the time information, and generates the encode subcode Q data 67 from the data for automatic generation 60 in which Adr is Adr5. (The subcode Q data and subcode data, each of which indicates the information other than the time information in accordance with the fact that Adr is Adr5 in the data for automatic generation 60, are referred to as the subcode Q data of Adr5 and subcode data of Adr5, respectively.) Further, by setting of a generation commencement sector and a number of generation cycles, the Adr5-subcode-Q-data generating portion 54 generates a timing signal for insertion of the encode subcode Q data 67 of Adr5, and provides the timing signal to the selector 78. Therefore, the circuit arrangement of the Adr5-subcode-Q-data generating portion 54 is obtained as a result of deleting the counters 61, 63 and the selectors 64, 66 from, and adding a circuit, which generates the timing signal for insertion of the encode subcode Q data

67, to the circuit arrangement shown in the portion defined by the chain double-dashed line in FIG. 13. The circuit which generates the timing signal for insertion of the encode subcode Q data 67 includes, for example, a first portion (comparison circuit) which determines whether or not a first count value which indicates the number of the generated subcode data of Adr0, 1 becomes the value of the preset generation commencement sector, and a second portion (comparison circuit) which determines whether or not a second count value which indicates the number of subcode data of Adr0 generated after the first count value became the value of the generation commencement sector becomes the preset number of generation cycles. Thereby, during the successive output of the subcode data of Adr0, 1, the subcode data of Adr5 is inserted when the above-mentioned first count value becomes the value of the generation commencement sector, and, then, is inserted when the above-mentioned second count value becomes the number of generation cycles. Further, in this embodiment, because the description of the commands are that shown in FIG. 14, the initial value of an address generating circuit included in the Adr5-subcode-Q-data generating portion 54 to generate the subcode component data is "50". However, the arrangement of the description of commands is not limited to that shown in FIG. 14, but may be arbitrarily set by the user for efficient utilization of the buffering area and simplification of the description of commands. In correspondence with the setting of the arrangement of the description of commands, the above-mentioned initial value of the address generating circuit should be set by the user. For example, although the commands for Adr5 start from the address "50" in FIG. 13, it is also possible to perform setting such that the commands for Adr5 start from the address "4". In this case, the above-mentioned initial value of the address generating circuit should be "4". Further, the information indicating the value of the generation commencement sector and the number of generation cycles may be set by the user in description of commands for Adr5.

When receiving the above-mentioned timing signal, the selector 78 selects the subcode Q data from any one of the subcode-Q-data generating units 52, 53 and 54 which one has transmitted this timing signal, and outputs the selected subcode Q data. When not receiving the above-mentioned timing signal, the selector 78 selects the subcode Q data from the Adr0, 1-subcode-Q-data generating unit 51, and outputs the selected subcode Q data. The thus-selected-and-outputted subcode Q data is latched for each frame, a CRC calculator 69 calculates CRC 68 for the latched data, and appends the calculated CRC to this data.

The thus-obtained subcode Q data is inputted to a selector 72. Then, one bit of the subcode Q data is selected by the selector 72 in accordance with the value of an offset counter 71 which performs the counting operation every request (ESUBREQB) from the EFM encoder 70. The thus-selected one bit of the subcode Q data is inputted to a selector 79. One bit of the subcode Q data stored in a paging area 75 of the buffer RAM of the DRAM 59 is also inputted to the selector 79 as a result of being selected by the selector 74. When QSRC=1 (a predetermined bit of the 8-bit data stored in MODE is 1), the selector 79 selects the automatically generated subcode Q data (output of the selector 72) and outputs the selected data as the encode subcode Q data. When QSRC=0 (the predetermined bit of the 8-bit data stored in MODE is 0), the selector 79 selects the subcode Q data stored in the paging area 75 (selected and outputted by the selector 74) and outputs the selected data as the encode subcode Q data.

The subcode-P-toggle generating portion 55 is a subcode-P-data automatic generating portion which automatically generates the subcode P data (SubP), and, as defined by the chain line in FIG. 13, includes a P-toggle portion 76 and a selector 77. The P-toggle portion 76 generates data from the internally generated channel clock, which data toggles at 2 Hz, that is, a signal, the level of which changes from a High state to a Low state and changes from the Low state to the High state, each change being performed twice a second. The selector 77 selects the above-mentioned data which toggles at 2 Hz or the data for each frame, that is, the 7-bit data (PMSB) of the subcode P data of the data for automatic generation 60 generated for each frame. When PTGL=1 (a predetermined bit of the 8-bit data stored in subcode P data is 1), the data from the P-toggle portion 76, which data toggles at 2 Hz, is selected. PTGL=0 (the predetermined bit of the 8=bit data stored in subcode P data is 0), the 7-bit data (PMSB) of the subcode P data is selected. As mentioned above, the subcode P data is data which toggles every 75/4 seconds between the High state and the Low state by counting sectors based on the original data of the subcode P data. The period of the toggling is 75/2 seconds.

The output of the above-mentioned selector 77 and the output selected by a selector 74 are input to a selector 73. When 'use PMSB'=1 (a predetermined bit of the 8-bit data stored in MODE is 1), the selector 73 outputs the output of the P-toggle portion 76 or the 7-bit data (PMSB) of the subcode P data as encode subcode P data. When 'use PMSB'=0 (the predetermined bit of the 8-bit data stored in MODE is 0), the selector 73 outputs the subcode P data (selected by the selector 74) stored in the paging area 75 as the encode sub P data. Thus, any one of the above-mentioned data from the P-toggle portion 76, which data toggles at 2 Hz, the data for each frame (PMSB) and the data of the paging area 75 is selected.

The other subcode data (R through W) is also selected by the selector 74 from the 96 bytes stored in the paging area in accordance with the value of the offset counter 71 which performs the counting operation every request (ESUBREQB) from the EFM encoder 70. The thus-selected one byte is outputted from the selector 74. The 6 bits of the subcode data (R through W) of the thus-outputted one byte are inputted to the EFM encoder 70 as encode subcode serial data. The two bits of the subcode P data and subcode Q data are input to the selectors 73 and 79, respectively, as mentioned above.

Thus, in the above-described arrangement, the Adr0, 1-subcode-Q-data generating portion 51, which automatically generates the subcode component data (encode subcode Q data 67) which indicates time information in the case where Adr is Adr0 or Adr1, and the subcode-Q-data generating portions 52, 53 and 54, which automatically generate the subcode component data (encode subcode Q data 67) which indicates information other than the time information in the case where Adr is Adr2, Adr3 and Adr5, respectively, operate separately. Thereby, regardless of whether or not the subcode component data which indicates the information other than the time information is generated, the Adr0, 1-subcode-Q-data generating portion 51 can generate the subcode component data which indicates the time information incrementally. Each of the subcode-Q-data generating portions 52, 53 and 54 separately generates the subcode component data which indicates the information other than the time information, without affecting the above-mentioned incremental subcode-component-data (indicating the time information) generation, and a respective one of the outputs of these generating portions 52, 53 and 54 is automatically inserted in desired timing (see FIGS. 15A and 15B) by the selector 78. Thereby, it is possible to remarkably reduce the frequency of operations of accessing the DRAM 59.

Further, when it is requested to cause the subcode P data of music data or the like to toggle at 2 Hz at the time of encoding, it is possible to avoid managing the number of sectors (where 75 sectors correspond to 1 second) and setting data every toggling, as a result of the subcode-P-toggle portion 55 being provided. Thereby, it is possible to avoid increase in the memory access frequency.

Further, as shown in FIG. 14, it is possible to divide the command description into an Adr0, 1 area, an Adr2 area, an Adr3 area and an Adr5 area, and to write the commands collectively in the respective areas. Therefore, description of the commands is easy, and, also, when it is assumed that the description of the commands into the DRAM 59 is included in the subcode-data generating circuit, manufacture of the subcode-data generating circuit is easy.

Further, the present invention is not limited to the above-described embodiment, and variations and modifications may be made without departing from the scope of the present invention.

The present invention is based on Japanese priority application No. 10-263661, filed on Sep. 17, 1998, the entire contents of which are hereby incorporated by reference.

What is claimed is:

1. A subcode-data generating circuit, which generates subcode data including subcode component data which indicates time information and additional subcode component data which indicates information other than the time information, said circuit comprising:

a first generating portion for automatically generating the subcode component data which indicates the time information;

a second generating portion for automatically generating the additional subcode component data which indicates the information other than the time information;

a selecting portion which selects an output of at least one of said first and second generating portions; and a memory, wherein said first generating portion operates according to a first command for automatic generation of a plurality of time information subcode component data, wherein said second generating portion operates according to a second command for automatic generation of a plurality of additional subcode component data, and wherein the first commands are written collectively in a first area of said memory, and the second commands are written collectively in a second area of said memory, and wherein each of said first commands written in said memory includes specification of a corresponding number of generation cycles.

2. The subcode-data generating circuit, as claimed in claim 1, wherein:

said second generating portion comprises a plurality of generating portions provided separately;

said second area of said memory comprises a plurality of areas corresponding to said plurality of generating portions; and commands of the second commands are written collectively in each area of said plurality of areas, which commands correspond to a respective one of said plurality of generating portions.

3. The subcode-data generating circuit of claim 1, wherein each first command triggers automatic generation of two or more subcode component data.

4. The subcode-data generating circuit of claim 1, wherein said first and second generating portions operate independently, and the first generating portion continues to generate automatically the subcode component data which indicates the time information even when the second generating portion is not automatically generating the additional subcode component data which indicates the information other than the time information.

5. The subcode-data generating circuit of claim 1, wherein said each of said first commands written in memory further includes specification of a generation commencement sector.

6. The subcode-data generating circuit of claim 1, wherein said each of said second commands written in memory includes specification of a corresponding number of generation cycles.

7. The subcode-data generating circuit of claim 6, wherein said each of said second commands written in memory includes specification of a generation commencement sector.

* * * * *